C. M. WRIGHT.
CHEESE CUTTER.
APPLICATION FILED NOV. 18, 1909.
954,662.
Patented Apr. 12, 1910.
2 SHEETS—SHEET 1.
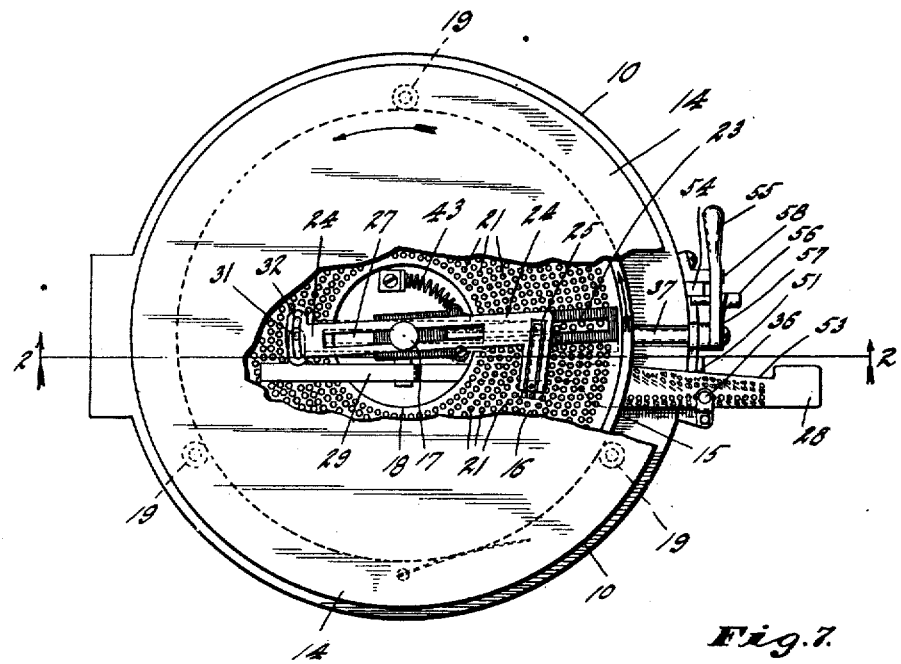
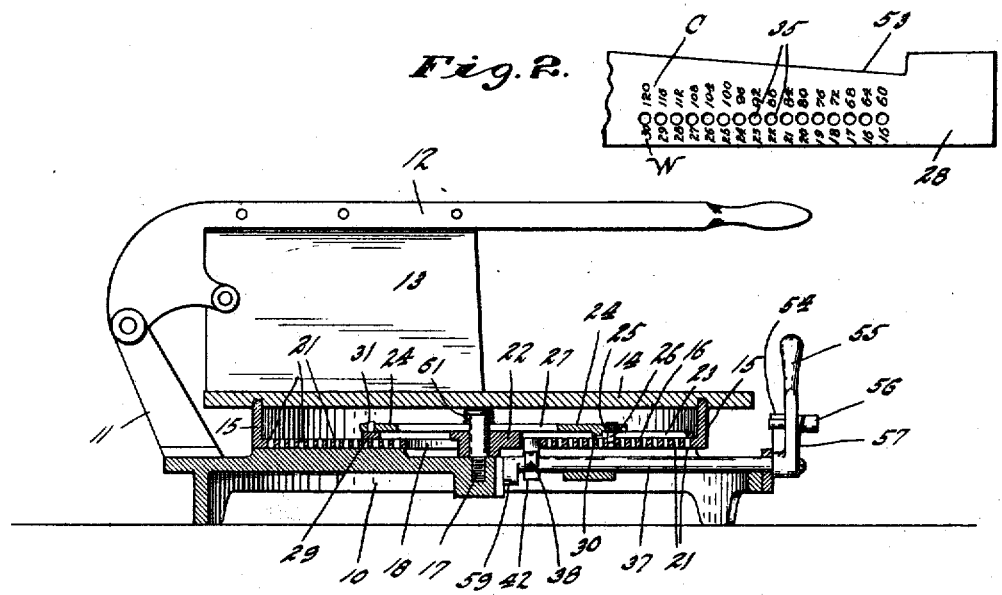
Witnesses
Frank A. Fahle
Thomas W. McMeans
Inventor
Charles M. Wright,
By Bradford Hood
Attorneys C. M. WRIGHT.
CHEESE CUTTER.
APPLICATION FILED NOV. 18, 1909.
954,662.
Patented Apr. 12, 1910.
2 SHEETS—SHEET 2.
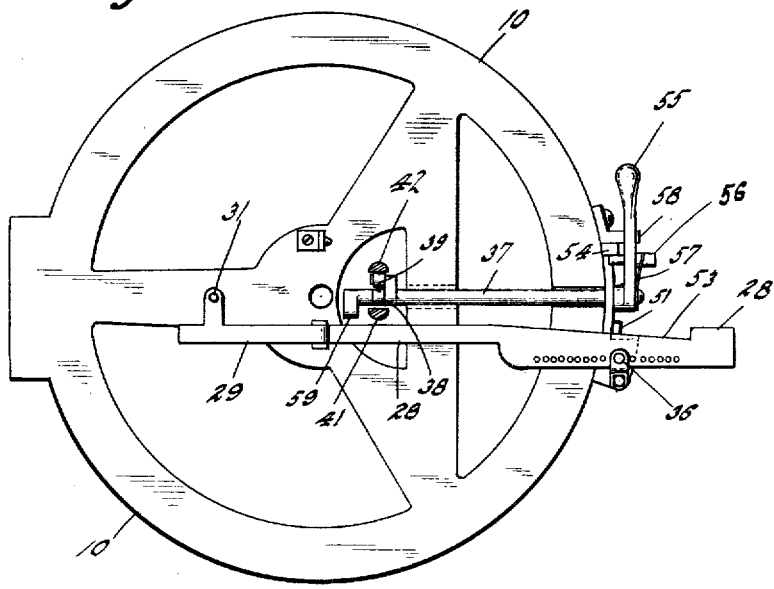
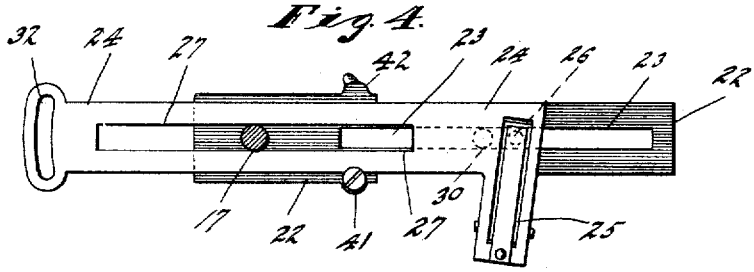
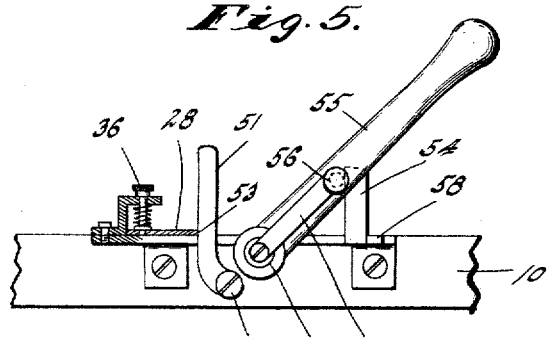
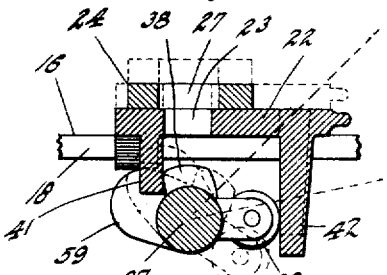
Witnesses
Frank A. Sable
Thomas W. McMeans
Inventor
Charles M. Wright,
By Bradford Hood
Attorneys

UNITED STATES PATENT OFFICE.

CHARLES M. WRIGHT, OF ANDERSON, INDIANA.

CHEESE-CUTTER.

954,662.

Specification of Letters Patent. Patented Apr. 12, 1910.

Application filed November [...] 1909. Serial No. 528,709.

*To all whom it may concern:*

Be it known that I, CHARLES M. WRIGHT, a citizen of the United States, residing at Anderson, in the county of Madison and State of Indiana, have invented certain new and useful Improvements in Cheese-Cutters, of which the following is a specification.

The object of my invention is to improve the construction of a cheese cutter so that the cheese carrying table may be accurately advanced a predetermined amount, depending upon the adjustment of the mechanism, the structure being more especially designed as an improvement in that type of cheese cutters described in claims in my Patent No. 863,340.

The accompanying drawings illustrate my invention.

Figure 1 is a plan of a machine embodying my invention, the cutting knife being omitted and a portion of the cheese-carrying table being cut away to show the parts beneath; Fig. 2 a section on line 2—2 of Fig. 1; Fig. 3 a horizontal section immediately beneath the gage plate; Fig. 4 a plan, on a larger scale, of the adjustable member for operating upon the gage plate; Fig. 5 a side elevation of the operating lever and associated parts; Fig. 6 a section, on an enlarged scale, illustrating the co-action between the operating rock shaft and the gage plate driver; Fig. 7 a detail, on an enlarged scale, of the indicator bar.

In the drawings, 10 indicates a suitable supporting base provided with a bracket 11 to which is provided a knife arm 12 carrying a usual cheese cutting knife 13. Rotatably mounted beneath knife 13 is a cheese-carrying table 14 which is supported upon the upper edge of a flange 15 of a circular gage plate 16 which is rotatably mounted upon base 10. The support for the gage plate 16 may be of any desired type but, in the present form, the operating mechanism therefor being supported upon the central pivot pin 17, I provide the gage plate with a large central opening 18 and hold the plate in position by means of rollers 19 journaled upon base 10 and distributed about the periphery of plate 16. The gage plate 16 is provided with a plurality of concentric series of perforations 21, the perforations in each series being so relatively spaced as to enable the production of uniform angular advancement of the cheese cutting table different, however, from the angular advancement produceable by the use of the perforations of any other series.

Pivoted upon pin 17 is an arm 22 which extends radially over the gage plate 16 and is provided with a radial slot 23. Slidably mounted upon arm 22 is a pawl-carrying plate 24 provided with a spring pawl 25 the end 26 of which passes downwardly through slot 23 in position to enter the perforations of any set of perforations 21. Plate 24 is provided with a longitudinal slot 27 through which pin 17 projects so as to form a guide for said plate. Plate 24 is also provided with a pin 30 which projects into slot 23, and in order to adjust the plate 24 upon arm 23 I provide an adjusting bar 28 which is projected beneath plate 16 as far as opening 18 and is there provided with an upwardly and forwardly extending extension 29 which projects over the upper face of the plate 16 and is provided with a finger 31 which extends into an arc-shaped slot 32 formed in the rear end of plate 24. Bar 28 is provided with a plurality of perforations 35 adapted to coöperate with a holding pin 36, carried by the base, and so spaced that pawl 25 may be thereby brought into coöperative alinement with any one of the series of perforations 21.

For the purpose of reciprocating arm 22 I provide a rock shaft 37 suitably journaled on base 10 and provided with a pair of cams 38 and 39 which lie between a pair of depending fingers 41 and 42 carried by bar 22, the arrangement being such that reciprocation of shaft 37 will produce a reciprocation of arm 22. It will be readily understood that the two cams 38 and 39 may be consolidated. A spring 43 serves to normally urge arm 22 to the position indicated by dotted lines in Fig. 1.

The distance between adjacent perforations of the holes of different series 21 varies and of course the amount of movement of arm 22, in order to bring pawl 26 into successive coöperative relation with the perforations of different series, varies with the radial position of the pawl and consequently a different throw of rock shaft 37 is required for the different series of perforations 21. In order to automatically regulate the throw of shaft 37, I provide a swinging abutment 51 which is pivoted at 52 to the base 10 adjacent shaft 37, and lies against an inclined edge 53 formed on bar 28. Secured to base 10 is a stationary abutment 54. Shaft 37 is rocked by means of an operating lever 55 secured thereto, and a stop pin 56, carried by said lever, is adapted to play between and engage the two abutments 51 and 54, so as to thus limit the throw of lever 55. The stop pin 56 is normally held in the position shown in Fig. 3 by means of a spring 57, but may be withdrawn so that lever 55 may be continued beyond abutment 54 and into engagement with a stop finger 58. When this movement takes place the cam 59, carried by shaft 37 comes up beneath arm 22 and shifts the same bodily upwardly on pin 17, against the action of a spring 61 so as to thus withdraw pawl 26 from the perforations of plate 16 so that, by withdrawing pin 36, bar 28 may be shifted longitudinally so as to thus shift plate 24 on arm 22 and thus bring pawl 26 into coöperative relation with any one of the concentric series of perforations in plate 16. As soon as this adjustment of the pawl has been accomplished pin 36 is lowered into the proper perforation 35 and lever 55 thrown upwardly until pin 36 engages the movable abutment 51 whereupon the pawl 26 will enter the appropriate one of the perforations 21, so that a subsequent movement of lever 51 to the position shown in Fig. 5 will cause a proper advancement of the cheese-carrying table relative to the knife.

In order to facilitate the setting of the parts I provide the upper face of bar 28, alongside perforations 35, with a scale W indicating total weights of cheeses. I also provide a scale C giving the number of perforations contained in each series of perforations 21, thus indicating the total number of cuts or pieces into which a cheese will be cut when any particular perforation 35 is brought opposite pin 36.

I claim as my invention:—

1. In a cheese cutter, the combination, with a suitable supporting base, of a cheese-carrying table rotatably mounted thereon, a gage plate carried by said table and provided with a plurality of concentric series of portions by which it may be engaged for movement, an arm extending substantially radially relative to said gage plate, a pawl mounted upon said arm and movable along the same, means by which said arm may be reciprocated, and means for limiting the range of movement of the arm-operating means.

2. In a cheese cutter, the combination, with a suitable supporting base, of a cheese-carrying table rotatably mounted thereon, a gage plate carried by said table and provided with a plurality of concentric series of portions by which it may be engaged for movement, an arm extending substantially radially relative to said gage plate, a pawl mounted upon said arm and movable along the same, and means by which said arm may be reciprocated.

3. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, and a pawl carried by said arm and movable thereon substantially radially of the gage plate.

4. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm and movable thereon substantially radially of the gage plate and means for limiting the movement of the rock shaft.

5. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm, a gage bar 28, means for holding said bar in any of its adjusted positions, intermediate connections between said bar and pawl, and means controlled by said bar for varying the possibility of movement of the rock shaft.

6. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm and movable thereon substantially radially of the gage plate, a gage bar 28, means for holding said bar in any of its adjusted positions, intermediate connections between said bar and pawl, a gage surface formed upon said bar, a movable abutment controlled by said gage surface, a fixed abutment, and an operating lever carried by the rock shaft and movable between said abutments.

7. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm and movable thereon substantially radially of the gage plate, and a cam carried by the rock shaft for shifting the pawl out of coöperative relation with the gage plate.

8. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm and movable thereon substantially radially of the gage plate, means for limiting the movement of the rock shaft, and a cam carried by the rock shaft for shifting the pawl out of coöperative relation with the gage plate.

9. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm, a gage bar 28, means for holding said bar in any of its adjusted positions, intermediate connections between said bar and pawl, means controlled by said bar for varying the possibility of movement of the rock shaft, and a cam carried by the rock shaft for shifting the pawl out of coöperative relation with the gage plate.

10. In a cheese cutter, the combination with a suitable supporting base, of a cheese-carrying table rotatably mounted thereon, a gage plate carried by said table and provided with a plurality of concentric series of portions by which it may be engaged for movement, a pivoted arm extending substantially radially relative to said gage plate, a rock shaft connected to said arm to reciprocate the same, a pawl carried by said arm and movable thereon substantially radially of the gage plate, a gage bar 28, means for holding said bar in any of its adjusted positions, intermediate connections between said bar and pawl, a gage surface formed upon said bar, a movable abutment controlled by said gage surface, a fixed abutment, an operating lever carried by the rock shaft and movable between said abutments, and a cam carried by the rock shaft for shifting the pawl out of coöperative relation with the gage plate.

11. In a cheese cutter, the combination with a rotary cheese carrying table and a cutter coöperating therewith of a reciprocating member for advancing the cheese carrying table step by step, and means for limiting the movement of said reciprocating member, said limiting means comprising a sliding gage bar provided with a series of gage portions adjacent which are arranged two sets of figures one indicating total cheese weights and the other indicating the number of movements of the reciprocating member required to produce a complete rotation of the cheese carrying table.

12. In a cheese cutter, the combination with a rotary cheese carrying table and a cutter coöperating therewith, of a reciprocating means for advancing said cheese carrying table step by step, a gage bar for adjusting the connection between said reciprocating member and the cheese carrying table and having an abutment-controlling portion, and an adjustable abutment coöperating with said portion of the gage bar and arranged within the path of movement of the reciprocating member.

In witness whereof, I, have hereunto set my hand and seal at Anderson, Indiana, this fifteenth day of November, A. D. one thousand nine hundred and nine.

CHARLES M. WRIGHT. [L. S.]

Witnesses:
 JOHN B. TALTIC,
 JAMES FLORA BAYLESS.